Figure 4:
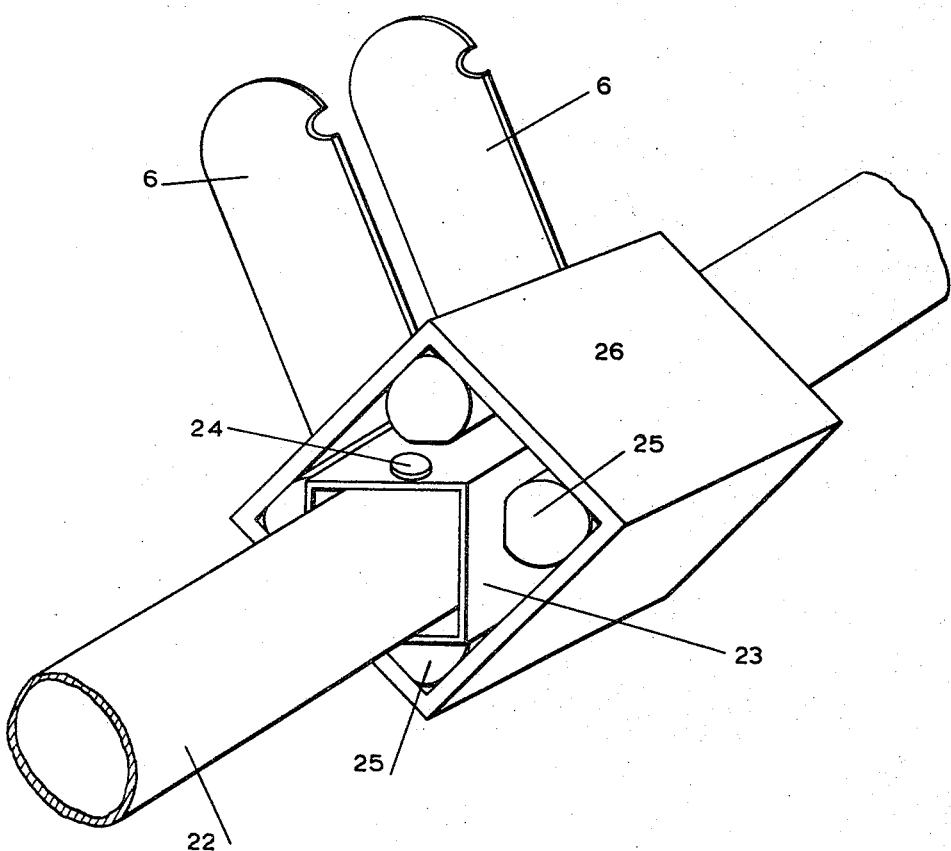

June 27, 1967 M. F. JONKER 3,327,838
MOUNTING FOR CONVEYOR BELT IDLERS
Filed April 6, 1966 2 Sheets-Sheet 1
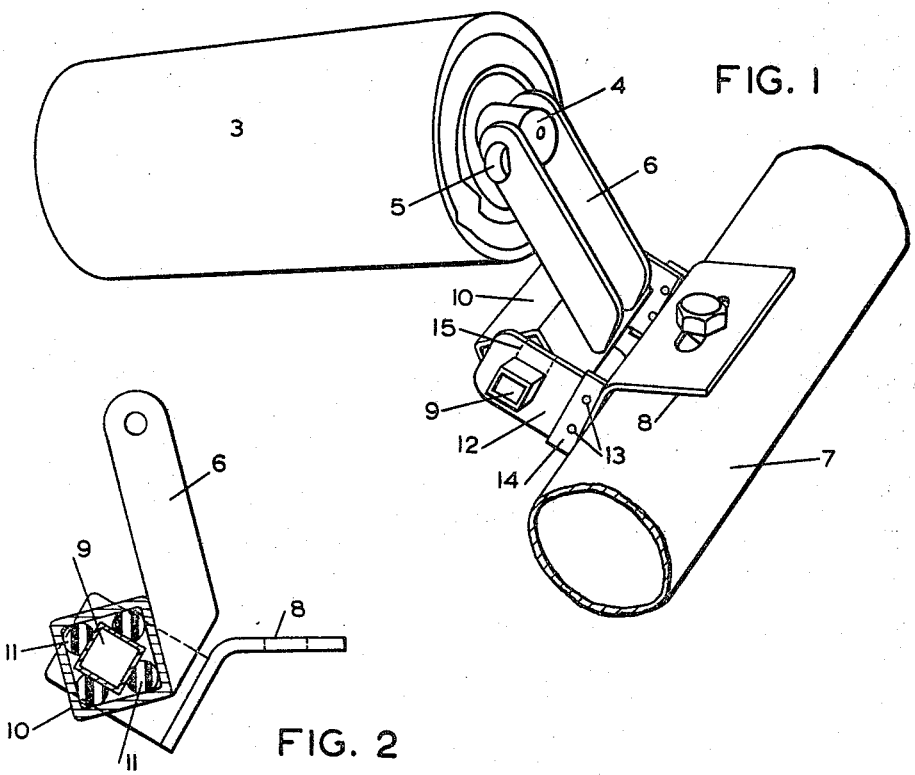
FIG. 1
FIG. 2
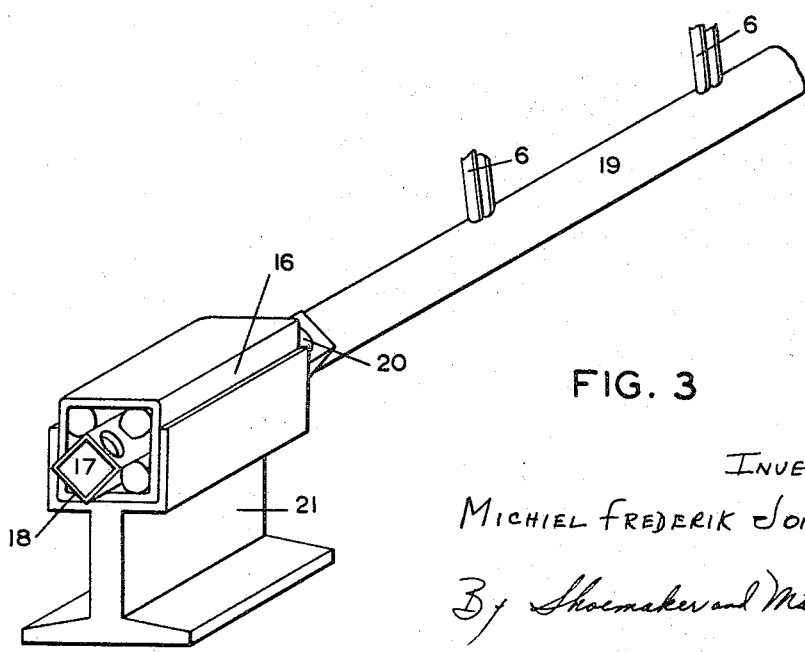
FIG. 3
INVENTOR
MICHIEL FREDERIK JONKER
By Shoemaker and Mattare
ATTORNEYS June 27, 1967     M. F. JONKER     3,327,838
MOUNTING FOR CONVEYOR BELT IDLERS Filed April 6, 1966     2 Sheets-Sheet 2

INVENTOR
MICHIEL FREDERIK JONKER
By Shoemaker and Mattare
ATTORNEYS

United States Patent Office 3,327,838
Patented June 27, 1967

3,327,838
MOUNTING FOR CONVEYOR BELT IDLERS
Michiel Frederik Jonker, Florida Park, Transvaal, Republic of South Africa, assignor to Wickman South Africa (proprietary), Limited, Selby, Johannesburg, Transvaal, Republic of South Africa
Filed Apr. 6, 1966, Ser. No. 540,578
Claims priority, application Republic of South Africa, Apr. 14, 1965, 65/1,984
4 Claims. (Cl. 198—192)

This invention relates to the mounting of troughing idlers for conveyor belts.

The belt of a conveyor is troughed to increase its load carrying capacity and, since the belt runs on idlers freely rotatable on a shaft or string of shafts hung between a pair of stanchions, it is necessary to increase virtually the length of the shaft or combined shafts of the idlers to effect the required troughing. This increase in length is often done by the insertion of a spring in members forming the shafts of the two end idlers in the transverse support for the belt. The angle of these end idlers could with advantage become more horizontal as the amount of troughing in the belt is decreased to avoid any tendency of the belt to climb on its idlers.

It is the object of this invention to so hang the flexible shaft, or string of shafts for the idlers, that the angle of the end idlers will readily flatten as the amount of troughing of the belt is decreased due to the reduction of the load on the belt. The idlers might be threaded on short lengths of wire cable but for convenience in this description of the invention it is assumed that there are three idlers in each transverse string between their stanchions and that there are three shafts suitably hinged together at their ends to form the combined shaft for the idlers.

According to this invention there is provided a troughing conveyor belt support comprising a member of rectilinear cross-section, a second member of similar cross-section surrounding the first member resilient cushioning means between the members, one of said members being rigidly supported and the other rotatable in relation thereto and connected to an upwardly projecting rigid arm adapted to be hinged to the end of an idler roller shaft for the conveyor belt.

The invention is illustrated in the accompanying drawings in which:

FIG. 1 shows an arm extending from a bracket and to which the one end of the idler shaft is hinged, FIG. 2 is a cross-section of said bracket and the central member and cushions, FIGS. 3 and 4 illustrate diagrammatically alternative arrangements using the same principle of resilience as set out in the other figures.

In FIG. 1, 3 is the end idler of a string of three or more idlers adapted to carry a troughing conveyor belt (not shown). 4 is one end of the shafts which are coupled together and on which the idlers rotate when carrying said troughing belt.

As the load on the belt increases the trough of the belts deepens and this takes place, according to this invention, by bringing the ends 4 of the string of shafts closer together. Each end 4 of the string of shafts are hinged by a pin 5 to an upwardly projecting arm 6.

7 is part of one of a pair of stanchions for supporting the idlers. 7 carries a bracket 8 and a central member 9 held between the end walls of bracket 8 to support a sleeve 10 to the outside of which the arm 6 is attached.

In FIG. 2 is shown on a smaller scale than FIG. 1 a section of the sleeve 10 and the central member 9. Both sleeve 10 and member 9 are rectangular in cross-section, in the examples shown they are both squares, and the spaces between the sleeve 10 and the member 9 are packed with cushions of elastic material such as rubber rods 11.

With the arrangement described and illustrated the arm 6 in FIG. 2 will normally stand practically vertical but under loading of the troughing belt carried by the idlers 3 the sleeve 10 will be rotated about the central member 9, the amount of rotation, and therefore the extent of the troughing of the belt, depending on the load carried and the amount of compression of the elastic material 11.

It is sometimes convenient to replace the elastic material 11, and to do this in one convenient manner provision is made for the removal of the side plate 12 of the bracket 8 which in this case would be held in position by set screws 13 in an extension 14 of bracket 8. The removal of the screws 13 would allow the side plate 12 to be loosened and freed from the central member 9 then the elastic material can be easily removed and renewed if necessary.

Alternatively the side plates 12 of the brackets 8 may be slotted as indicated in dotted lines 15 in FIG. 1.

FIG. 3 shows an alternative system using the same basic principle as that described above.

In this case the outer sleeve 16 is held stationary on the pedestal supports 21 for the conveyor idlers system and the inner central member 17 has ends 18 which project outwardly from the outer sleeve 16. The ends 18 are suitably secured to the stanchions 19, for example by means of diametrically located pin 20, to the ends 18 of the inner member 17.

The arms 6 for connection to the end 4 of the idler shaft are in this case rigidly secured to the stanchions 19 and troughing of the rollers is obtained by rotation of the stanchions 19 and inner member 17 relative to the fixed outer sleeve 16.

FIG. 4 shows a further alternative arrangement according to the invention more or less on the scale of FIG. 1.

In this form the stanchion 22 is retained stationary as described for FIG. 1 but has, at each point of attachment for a string of idlers, an inner rectilinear sleeve 23 secured thereto by pins or bolts 24. This sleeve forms the stationary member of the resilient idler supporting unit and has rubber rods 25 against its side faces and held in the outer member 26 which is off-set as in the other examples and carries the upwardly projecting arms 6 for attachment to the end 4 of an idler shaft. In this case also resilient deflection of the arms 6 is possible against the rolling compression of rods 25 and it enables a strong assembly to be made in a confined space.

What I claim as new and desire to secure by Letters Patent is:

1. A troughing conveyor belt support comprising an idler roller shaft, an arm, a first member of rectilinear cross-section, a second member of rectilinear cross-section surrounding the first member, resilient cushioning means between the two members and support means rigidly supporting one of the said members, the other member being rotatable relative to said one member one end of said arm rigidly connected to said other member, and the other end of said arm being hinged to one end of said idler roller shaft for the conveyor belt.

2. A troughing conveyor belt support according to claim 1, wherein said support means comprises a stanchion and a bracket carried thereby, said bracket rigidly supporting said first member, said second member being rotatable and carrying said arm.

3. A troughing conveyor belt support according to claim 1 wherein a pedestal rigidly supports said second member, and a stanchion rigidly secured to said first member and carrying at least one of said arms.

4. A troughing conveyor belt support according to claim 1 wherein said rectilinear members are square in cross-section and the members are off set from each other through an angle of 45°, and said cushioning means being rubber bars, and said bars being positioned in each corner of the second member and against the side surfaces of the first member.

References Cited

UNITED STATES PATENTS 3,138,240   6/1964   Michaelson _____ 198—192

EVON C. BLUNK, *Primary Examiner.*
RICHARD E. AEGERTER, *Examiner.*